(12) United States Patent
Lee (10) Patent No.: US 11,724,683 B2
(45) Date of Patent: Aug. 15, 2023

(54) HOVERCRAFT HAVING STEALTH FUNCTION

(71) Applicant: K-MARINE CO., LTD., Gunsan-si (KR)

(72) Inventor: Chan Woo Lee, Iksan-si (KR)

(73) Assignee: K-MARINE CO., LTD., Gunsan-si (KR)

( * ) Notice: Subject to any disclaimer, the term of this patent is extended or adjusted under 35 U.S.C. 154(b) by 112 days.

(21) Appl. No.: 17/428,361

(22) PCT Filed: Jun. 29, 2020

(86) PCT No.: PCT/KR2020/008439
§ 371 (c)(1),
(2) Date: Aug. 4, 2021

(87) PCT Pub. No.: WO2021/137368
PCT Pub. Date: Jul. 8, 2021

(65) Prior Publication Data
US 2022/0048491 A1    Feb. 17, 2022

(30) Foreign Application Priority Data
Jan. 2, 2020 (KR) .......................... 10-2020-0000110

(51) Int. Cl.
*B60V 1/14* (2006.01)
*B60V 1/11* (2006.01)
*B60V 1/16* (2006.01)

(52) U.S. Cl.
CPC .............. *B60V 1/14* (2013.01); *B60V 1/115* (2013.01); *B60V 1/16* (2013.01)

(58) Field of Classification Search
CPC .................................. B60V 1/15; B60V 1/18
See application file for complete search history.

(56) References Cited

U.S. PATENT DOCUMENTS 4,421,489 A * 12/1983 Van Veldhuizen ....... B60V 1/14
440/37
5,096,013 A *  3/1992 Yoshida ................... B60V 1/14
181/290

FOREIGN PATENT DOCUMENTS

| DE | 3829345 C2 * | 8/1988 |
| EP | 1917182 B1 | 10/2009 |
| JP | 2518011 Y2 | 11/1996 |

(Continued)

OTHER PUBLICATIONS

International Search Report issued in PCT/KR2020/008439; dated Sep. 15, 2020.

*Primary Examiner* — Kevin Hurley
(74) *Attorney, Agent, or Firm* — Studebaker & Brackett PC (57) ABSTRACT

A hovercraft having a stealth function. The hovercraft includes at least: a hull in which a cabin is provided; a power generator provided on the hull and configured to supply a lifting force with which the hull is lifted and a propelling force with which the hull is propelled; a skirt provided at a lower portion of the hull and causes the hull to be lifted by the lifting force supplied by the power generator; an opening/closing louver assembly made up of a plurality of opening/closing louvers on air intakes formed in an outer surface of the hull; and a steering louver assembly made up of a plurality of rudder louvers that are rotated and opened/closed on a port and a starboard of a rear of the opening/closing louver assembly on the outer surface of the hull.

5 Claims, 6 Drawing Sheets

(56) References Cited

FOREIGN PATENT DOCUMENTS

| JP | 2004-026119 A | 1/2004 |
|---|---|---|
| KR | 10-2013-0065905 A | 6/2013 |
| KR | 10-1858183 B1 | 5/2018 |

* cited by examiner

HOVERCRAFT HAVING STEALTH FUNCTION

CROSS-REFERENCE TO RELATED APPLICATIONS

This application is a National Phase Application of PCT Application No. PCT/KR2020/008439, filed Jun. 29, 2020, which is based upon and claims the benefit of priority to Korean Patent Application No. 10-2020-0000110, filed Jan. 2, 2020. The disclosures of the above-listed applications are hereby incorporated by reference herein in their entirety.

BACKGROUND

(a) Technical Field

The present disclosure relates to a hovercraft having a stealth function, and more particularly, to a hovercraft having a stealth function which cannot be easily detected by a radar or a sonar by applying stealth appearance technology, noise reduction technology for a power system, and stealth paint technology to a hovercraft lifted and propelled on the water.

(b) Background Art

An air-cushion vehicle (a hovercraft) is an amphibious ship that jets air below a hull to run in a lifted state without the hull touching water and thus is low in resistance caused by a density of water, and that, without a screw, can run on a topography on which a general ship cannot run, a swamp covered with waterweeds, a coast covered with seaweeds, and places covered with a snow and a mud, and a sand.

Due to these features, a demand for the hovercraft has been rapidly increased in recent years, and thus technical development has been accelerated. Especially, the hovercraft has shown a tendency to expand a demand and a distribution toward a military ship, an excursion ship, a leisure boat, and so on.

An example of the hovercraft according to the related art is disclosed in Korean Registered Patent No. 10-1858183 (registered on May 9, 2018, and hereinafter referred to as "Patent Document 1").

However, because the hovercraft according to the related art is provided only in a structure that is merely lifted and propelled on the water and has no structure that prevents detection by an external radar or sonar, the hovercraft has a problem in that it is difficult to be used for military use.

Prior Art Document

[Patent Document 0001]
Korean Registered Patent No. 10-1858183 (registered on May 9, 2018)

SUMMARY OF THE DISCLOSURE

An objective of the present disclosure is to provide a hovercraft having a stealth function which cannot be easily detected by a radar or a sonar by applying stealth appearance technology, noise reduction technology for a power system, and stealth paint technology to a hovercraft lifted and propelled on the water.

To achieve the objective, a hovercraft having a stealth function according to the present disclosure includes: a hull in which a cabin is provided; a power generator provided on the hull and configured to supply a lifting force with which the hull is lifted and a propelling force with which the hull is propelled; a skirt provided at a lower portion of the hull and causes the hull to be lifted by the lifting force supplied by the power generator; an opening/closing louver assembly made up of a plurality of opening/closing louvers on air intakes formed in an outer surface of the hull; and a steering louver assembly made up of a plurality of rudder louvers that are rotated and opened/closed on a port and a starboard of a rear of the opening/closing louver assembly on the outer surface of the hull. At least one of the opening/closing louver assembly and the steering louver assembly is provided to have an inclined form that is mutually symmetric left and right so as to scatter incident energy of radar electromagnetic waves along with the outer surface of the hull, and to have a shape of an irregular surface, Here, air ducts are provided inside the hull such that air flowing in by opening of the opening/closing louvers circulates and flows out by opening of the rudder louvers, the air ducts are provided to branch from the power generator on a plane in such a manner that characters "Y" are mutually oriented front and rear, and the power generator is provided in a joined space of front and rear branch centers at the air ducts.

In addition, at least one of the opening/closing louver assembly and the steering louver assembly is provided to include a sound absorption material.

EFFECTS OF INVENTION

According to the present disclosure, it is possible to provide a hovercraft having a stealth function which can make stealth detection difficult by a radar or a sonar by applying stealth appearance technology, noise reduction technology of a power system, and stealth paint technology to the hovercraft that is lifted and propelled on the water.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

List of Reference Signs

100: Hull
110: Air intake
200: Power generator
300: Skirt
400: Opening/closing louver assembly
410: Opening/closing louver 500: Steering louver assembly
510: Rudder louver
600: Air duct

DETAILED DESCRIPTION

Hereinafter, the present disclosure will be described in detail with reference to the attached drawings.

Figure 1:
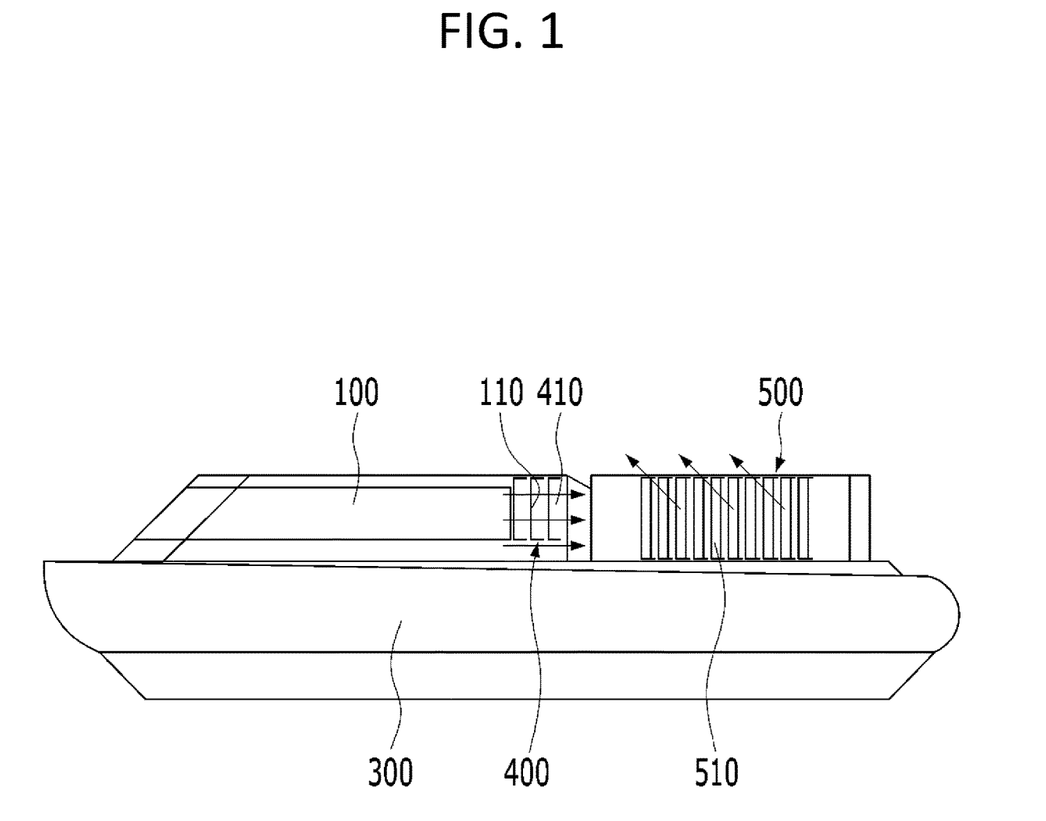
FIG. 1 is aside view illustrating a hovercraft having a stealth function according to the present disclosure.
Figure 2:
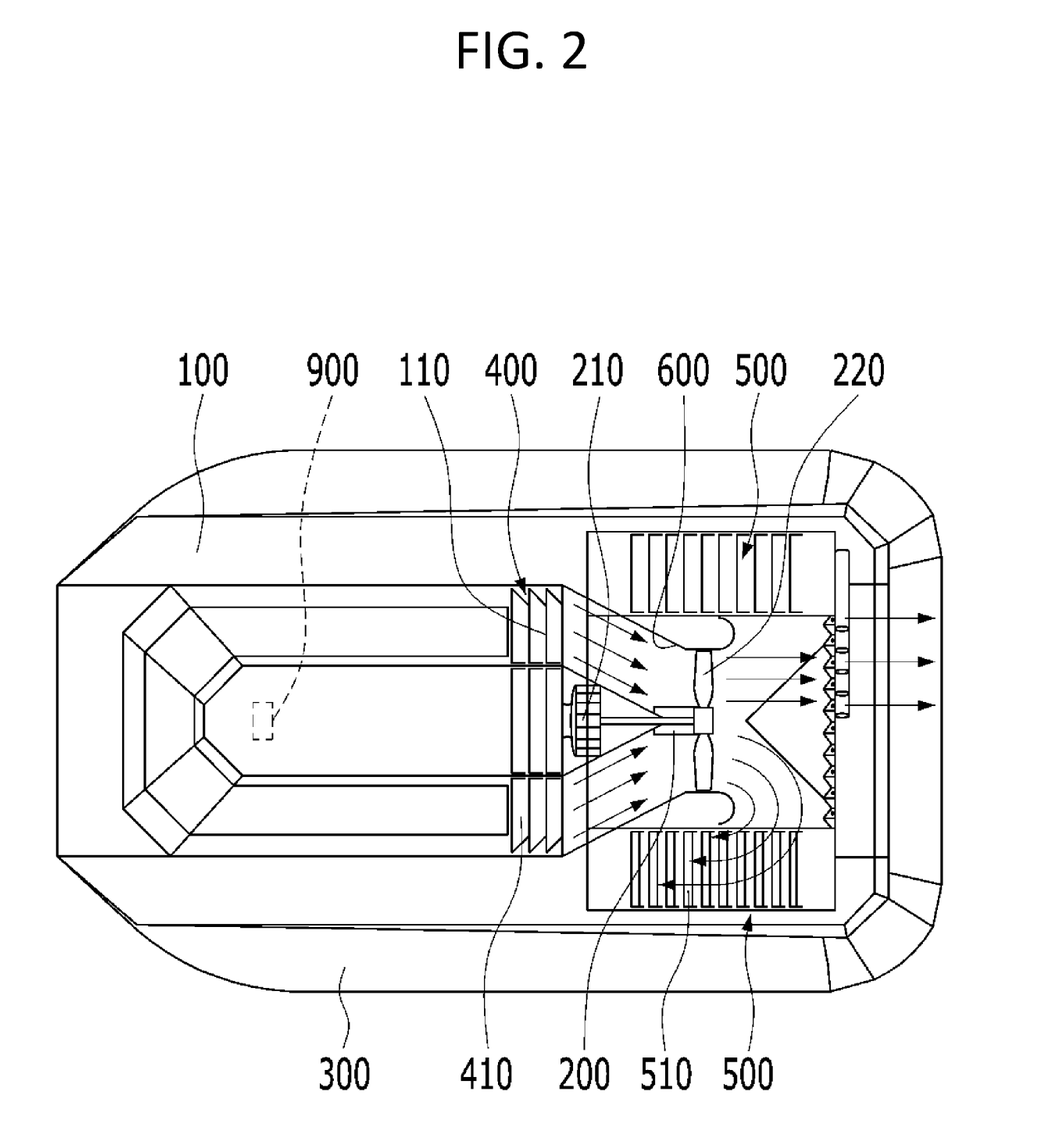
FIG. 2 is a top view illustrating the hovercraft having a stealth function according to the present disclosure.

As illustrated in FIGS. 1 and 2, a hovercraft having a stealth function according to the present disclosure includes a hull 100 in which a cabin is formed, a power generator 200 that is provided on the hull 100 and supplies a lifting force that lifts the hull 100 and a propulsion that propels the hull 100, a skirt 300 that is provided at a lower portion of the hull 100 and causes the hull 100 to be lifted by the lifting force supplied by the power generator 200, an opening/closing louver assembly 400 made up of a plurality of opening/closing louvers 410 in air intakes 110 formed in an outer surface of the hull 100, and a steering louver assembly 500 made up of a plurality of rudder louvers 510 that are rotated and opened/closed on the port and starboard of the rear of the opening/closing louver assembly 400 on the outer surface of the hull 100.

The hull 100 has a control cabin provided therein, a front surface thereof is provided in a sharply inclined form such that incidence and reflection of electromagnetic waves of a radar from the outside are minimized and high-speed traveling is possible during traveling, and is provided in an angled form and roughly slim form on the whole.

Here, the hull 100 is preferably formed of a carbon fiber reinforced plastic (CFRP) material in order to reduce hull weight of the entire hovercraft according to the present disclosure.

Further, a surface of the hull 100 is preferably painted with a stealth paint including a composite that is mechanically mixed or blended using a silicone rubber or a rubber series such as a terpolymer ethylene polyethylene copolymer of chlorinated polyethylene chlorosulfonated polyethylene or ethylene propylene diene, or a stealth paint including phosphate and polyaniline.

Thus, the surface of the hull 100 is configured to have at least one characteristic of a dielectric, a magnet, and a conductor, and stealth appearance technology and stealth paint technology are applied to the hovercraft that is lift and propelled on the water. Thereby, stealth performance of the hovercraft according to the present disclosure can be improved.

As illustrated in FIGS. 2 to 5, the power generator 200 includes an engine and a hydraulic tank. A lifting fan 210 causing the hull 100 to be lifted by rotational operation is connected to the power generator 200, and a propelling fan 220, which is connected through a power transmission shaft rotating the lifting fan 210 and causes the hull 100 to be propelled, is connected to the power generator 200.

Thus, the power generator 200 is provided in a one-body type that distributes power from the same single power source, rather than two power sources provided for lifting and propelling, into two portions for lifting and propelling. Thereby, a hovercraft having a stealth function, in which a noise reduction technology of a power system is applied to the hovercraft that is lifted and propelled on the water and which cannot be easily detected by a radar or a sonar, can be provided.

Further, the power generator 200 according to the present disclosure is provided in a one-body type, thereby reducing manufacturing costs of the hovercraft.

Meanwhile, the propelling fan 220 according to the present disclosure is preferably made of a variable pitch propeller so as to be suitable for a hull speed.

Here, a sound absorption structure and components for absorbing noise are preferably applied to the power generator 200, the lifting fan 210, the propelling fan 220, and a power transmission system among the power generator, the lifting fan, and the propelling fan.

Meanwhile, the power generator 200 according to the present disclosure automatically calculates optimum torque of the propeller of the propelling fan 220 required for propelling of the hovercraft and the lifting fan 210 required for lifting of the hovercraft according to a start, a cruising speed running, accelerating running, or a stop situation of the hovercraft, drives the propeller of the one-body lifting system, and lifts and propels the hovercraft at the same time.

Further, if necessary, a gasoline engine or a diesel engine may be used for the power generator 200, but an electric motor may be used.

As illustrated in FIGS. 1 to 5, the skirt 300 is provided to form an air lifting space with air flowing into the lifting fan 210 by an operation of the power generator 200 when the opening/closing louvers 410 and the rudder louvers 510 are opened, such that the hovercraft is lifted without coming into with water.

The skirt 300 according to the present disclosure highly lifts the hull 100 at a low pressure, reduces an amount of air leaking from the air lifting space, and maximizes output efficiency.

To this end, the skirt 300 according to the present disclosure is configured to minimize damage caused by friction although the hovercraft comes into with the ground and the surface of water, and is preferably formed of a light material.

As illustrated in FIGS. 1 and 2, the opening/closing louver assembly 400 includes the plurality of opening/closing louvers 410 that open/close the air intakes 110 of the hull 100, and is provided such that inflow of air into air ducts 600 (to be described below) is regulated by opening/closing of the opening/closing louvers 410.

As illustrated in FIGS. 1 and 2, the steering louver assembly 500 includes the plurality of rudder louvers 510 that open/close discharge port portions of the air ducts 600 disposed to be mirror symmetric with respect to the center of the hull 100, and is provided such that the hull 100 is subjected to turnabout such as left turn or right turn by opening/closing of the rudder louvers 510 provided on the port side or by opening/closing of the rudder louvers 510 provided on the starboard side.

Figure 4:
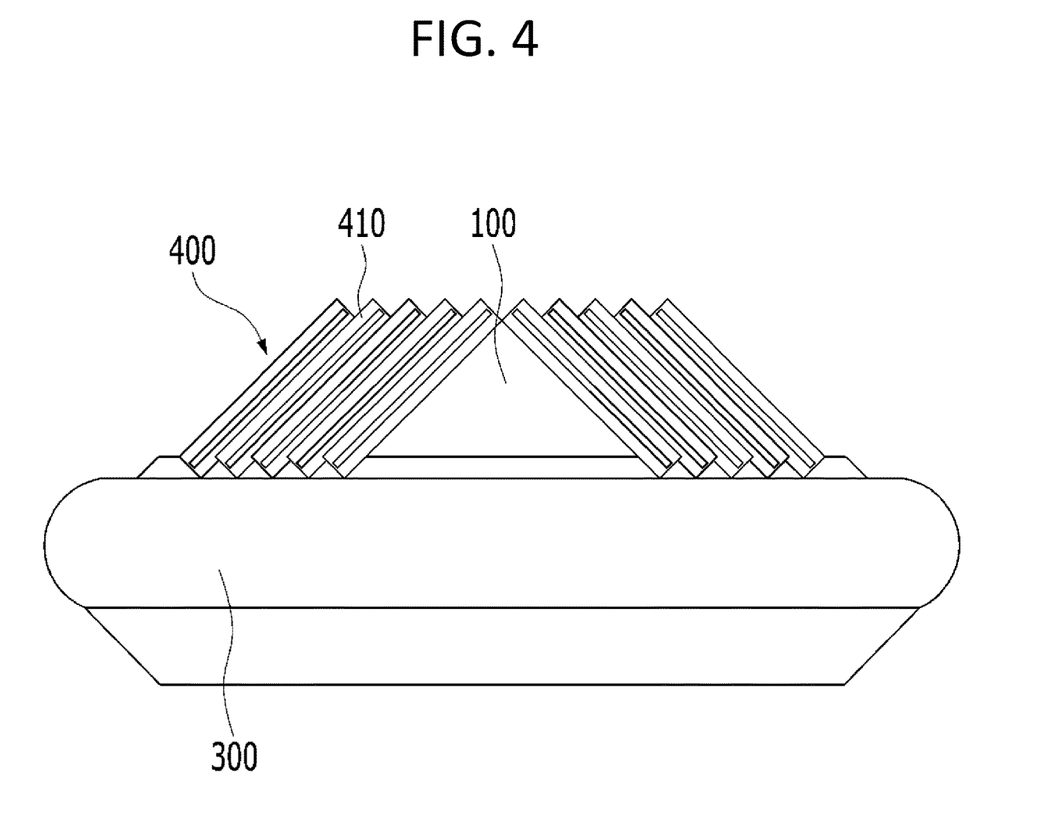
FIG. 4 is a front view illustrating the hovercraft having a stealth function according to the present disclosure.
Figure 5:
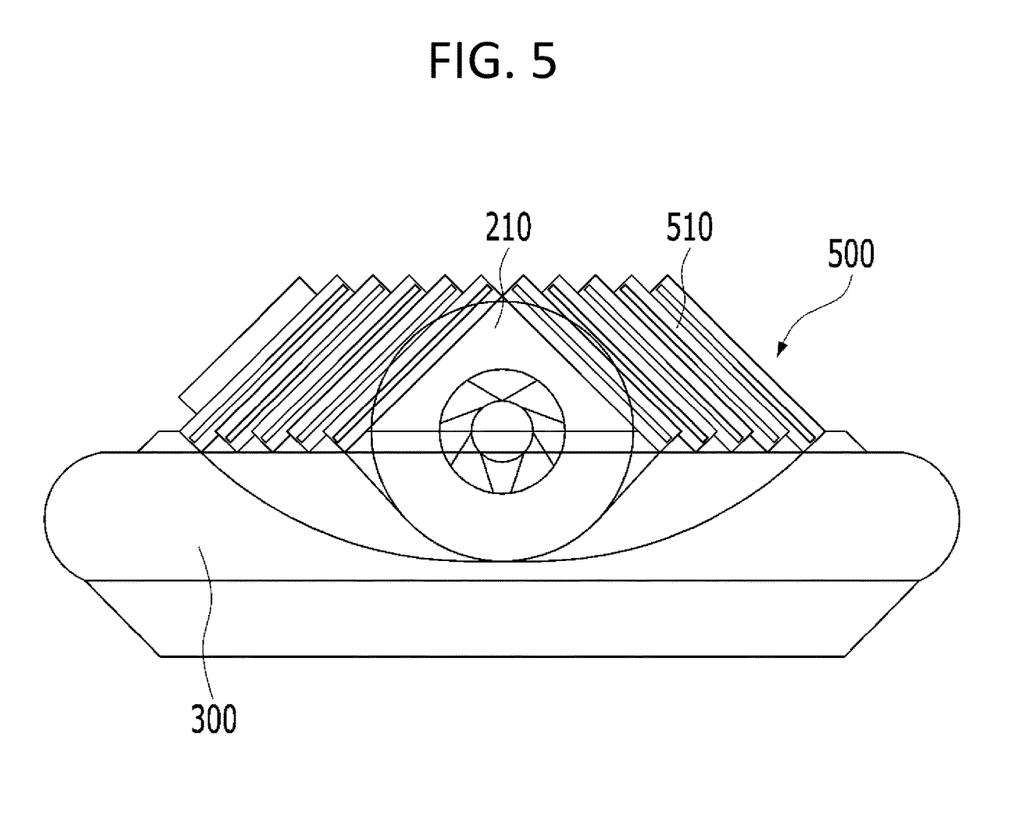
FIG. 5 is a rear view illustrating the hovercraft having a stealth function according to the present disclosure.

As an embodiment of the present disclosure, at least one of the opening/closing louver assembly 400 and the steering louver assembly 500 is preferably provided, as illustrated in FIGS. 4 and 5, to have an inclined form that is mutually symmetric left and right in order to scatter incident energy of radar electromagnetic waves along with the outer surface of the hull 100, and to have a shape of an irregular surface.

Thus, the appearance of the hovercraft according to the present disclosure is configured to be able to have a stealth function of preventing stealth detection by blocking strong single and multiple reflection of radar electromagnetic waves from the outside, and stealth appearance technology, noise reduction technology of a power system, and stealth paint technology are applied to the hovercraft that is lifted and propelled on the water. Thereby, a hovercraft having a stealth function of making detection difficult by a radar or a sonar can be provided.

Figure 3:
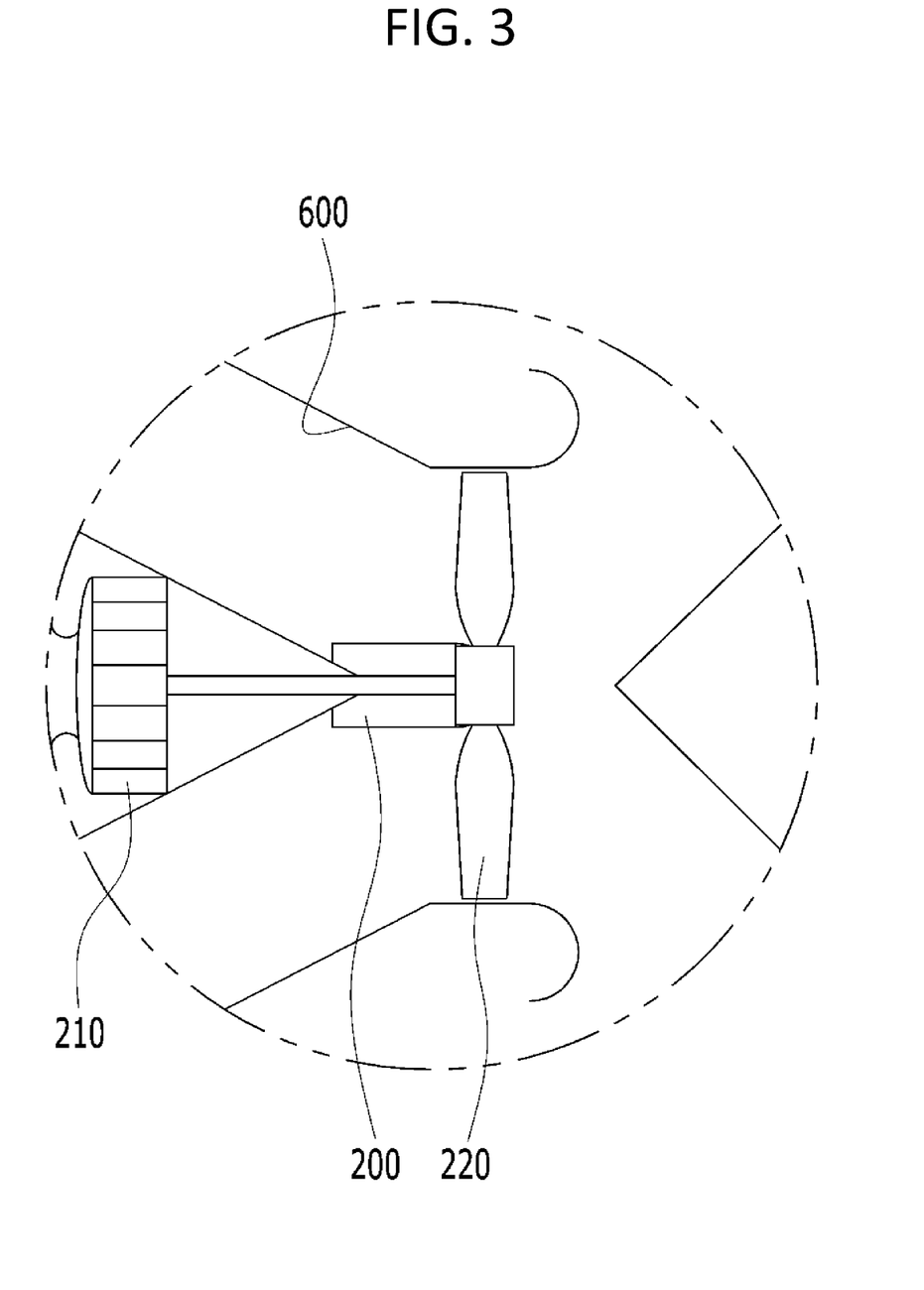
FIG. 3 is an enlarged view illustrating a portion where a power generator is provided on an air duct of FIG. 2.

Meanwhile, as illustrated in FIGS. 2 and 3, air ducts 600 are provided inside the hull 100 such that air flowing in by opening of the opening/closing louvers 410 circulates and flows out by opening of the rudder louvers 510, and the air ducts 600 are provided to branch from the power generator 200 on the plane in such a manner that characters "Y" are mutually oriented front and rear. The power generator 200 is preferably provided in a joined space of front and rear branch centers at the air ducts 600.

Thus, due to shapes of the air ducts 600 according to the present disclosure, and arrangement of the power generator 200, the lifting fan 210, and the propelling fan 220, only simple opening/closing operations of the opening/closing louver assembly 400 and the steering louver assembly 500 enable circuitous running and turnabout of the hovercraft to be easily controlled without a separate rudder or key as in the related art. By omitting the conventional component of the rudder or the key, without a structure that is roughly projected or exposed on the appearance of the hovercraft according to the present disclosure, a smart stealth appearance can be achieved.

As an embodiment of the present disclosure, at least one of the opening/closing louver assembly 400 and the steering louver assembly 500 is preferably provided to include a sound absorption material containing supermicrofibers.

Thus, the noise reduction technology is applied to the hovercraft that is lifted and propelled on the water, thereby providing a hovercraft having a stealth function of enabling detection to be difficult by a radar or a sonar.

Figure 6:
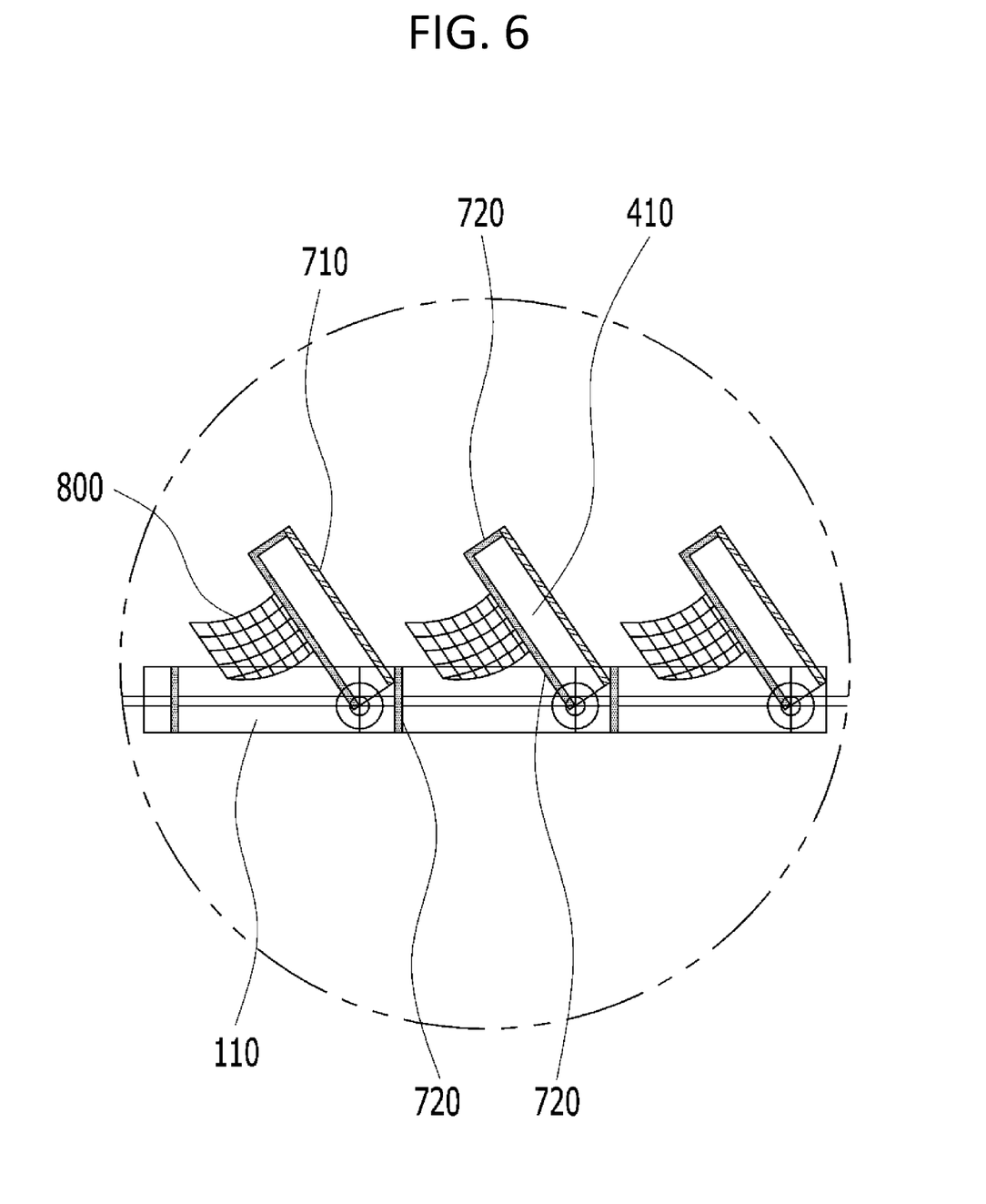
FIG. 6 is an enlarged view illustrating a partial region of an opening/closing louver assembly according to the present disclosure.

Meanwhile, as illustrated in FIG. 6, a stealth paint layer 710 for absorbing electromagnetic waves is provided on an upper surface of each opening/closing louver 410 of the opening/closing louver assembly 400 according to the present disclosure and on an upper surface of each rudder louver 510 of the steering louver assembly 500 according to the present disclosure. A sound absorption layer 720 for absorbing noise is preferably provided on portions excluding the upper surfaces from the opening/closing louver 410 and the rudder louver 510 and inner surfaces of the air intakes 110 that come into contact with them when closed.

Thus, a stealth function of the hovercraft according to the present disclosure can be further improved by the stealth paint layers 710 provided on each of the opening/closing louvers 410 and the rudder louvers 510, and a noise reduction performance can be further improved by the sound absorption layers 720.

Meanwhile, as illustrated in FIG. 6, lower portions of each opening/closing louver 410 of the opening/closing louver assembly 400 and each rudder louver 510 of the steering louver assembly 500 according to the present disclosure may be provided with stealth networks 800 that are spread when they are opened, are formed of a stealth paint material for absorbing or scattering radar electromagnetic waves, or are painted with a stealth paint.

Thus, when each opening/closing louver 410 and each rudder louver 510 are opened, radar electromagnetic waves that are incident from the outside and reflected are disturbed to the utmost by the stealth networks 800 according to the present disclosure, and thus the stealth function of the hovercraft according to the present disclosure can be more definitely performed.

Here, the stealth networks 800 may be configured such that one sides thereof are fixed to the lower portions of each opening/closing louver 410 and each rudder louver 510 and the other sides thereof are freely provided without being fixed. However, the stealth networks 800 may be configured such that one sides thereof are fixed to the lower portions of each opening/closing louver 410 and each rudder louver 510 and the other sides thereof are fixed to the air intakes 110 or inner surfaces of air discharge ports.

Meanwhile, as illustrated in FIG. 2, the opening/closing louvers 410 and the rudder louvers 510 according to the present disclosure are preferably controlled to be opened/closed by a controller 900 provided on the hull 100.

Thus, when a person in charge of running inputs a running control signal such as turnabout of the hovercraft in the cabin of the hull 100, opening/closing of the opening/closing louvers 410 and the rudder louvers 510 is controlled by control of the controller 900, and the hovercraft can be easily controlled.

Further, the controller 900 according to the present disclosure adjusts an amount of wind according to an input signal that is input, controls a lifting height of the hovercraft, enables a person in charge of running to stably control the hovercraft, measures weight of passengers who get on the hovercraft, measures a wind speed and pressure in real time in order to detect a flow of air, and enables the person in charge of running to easily control a desired running state using the results.

In addition, the controller 900 according to the present disclosure can control a running state by setting an optimum running state and maintaining a preset running state on the basis of results measured from sensors.

The technical aspect of the disclosure has been described with reference to the attached drawings described and illustrated by the above. However the technical spirit of the disclosure is for illustrative purpose, and is not for limitative purpose. It will be understood to those having ordinary skill in the art that various changes and modifications of the present disclosure are possible without the technical spirit of the present disclosure departing from the technical scope described in the claims to be described below.

INDUSTRIAL AVAILABILITY

The present disclosure relates to a hovercraft having a stealth function, and is available in the industrial field relevant to the national defense

What is claimed is:
1. A hovercraft having a stealth function comprising:
a hull in which a cabin is provided;
a power generator provided on the hull and configured to supply a lifting force with which the hull is lifted and a propelling force with which the hull is propelled;
a skirt provided at a lower portion of the hull and causes the hull to be lifted by the lifting force supplied by the power generator;
an opening/closing louver assembly comprising a plurality of opening/closing louvers on air intakes formed in an outer surface of the hull; and
a steering louver assembly comprising a plurality of rudder louvers that are rotated and opened/closed on a port and a starboard of a rear of the opening/closing louver assembly on the outer surface of the hull,
wherein each louver of the plurality of opening/closing louvers has a rectangular cross section having a longitudinal axis inclined with respect to an axis perpendicular to an upper surface of the skirt, and/or each louver of the plurality of rudder louvers has a rectangular cross section having a longitudinal axis inclined with respect to the axis perpendicular to the upper surface of the skirt, and
wherein the plurality of opening/closing louvers or the plurality of rudder louvers are positioned as being mutually symmetric left and right, and configured to scatter incident energy of radar electromagnetic waves along with the outer surface of the hull, and to have a shape of an irregular surface.

2. The hovercraft according to claim 1, wherein:

air ducts are provided inside the hull such that air flowing in by opening of the opening/closing louvers circulates and flows out by opening of the rudder louvers;

the air ducts are provided to branch from the power generator on a plane in such a manner that characters "Y" are mutually oriented front and rear;

the air ducts comprises a first straight air duct configured to pass air received from a first air intake of the air intakes, and a second straight air duct configured to pass air received from a second air intake of the air intakes;

a first end of the first straight air duct is connected with the first air intake of the air intakes, a first end of the second straight air duct is connected with the second air intake of the air intakes, and a second end of the first straight air duct is connected with a second end of the second straight air duct; and the power generator is provided in a joined space of front and rear branch centers at the air ducts.

3. The hovercraft according to claim 1, wherein at least one of the opening/closing louver assembly and the steering louver assembly is provided to include a sound absorption material.

4. The hovercraft according to claim 2, wherein at least one of the opening/closing louver assembly and the steering louver assembly is provided to include a sound absorption material.

5. The hovercraft according to claim 1, further comprising:

a lifting fan configured to cause the hull to be lifted by rotational operation, and connected to the power generator;

a propelling fan configured to cause the hull to be propelled, and connected to the power generator through a power transmission shaft rotating the lifting fan.

* * * * *